(12) United States Patent
Giles et al.

(10) Patent No.: US 11,294,731 B2
(45) Date of Patent: Apr. 5, 2022

(54) JOINT TRANSMISSION COMMITMENT SIMULATION

(71) Applicant: Google LLC, Mountain View, CA (US)

(72) Inventors: James Giles, Yorktown Heights, NY (US); Nitish J. Korula, New York, NY (US); Martin Blais, New York, NY (US); Michael Sobin, New York, NY (US); Son Ba Nguyen, Jersey City, NJ (US); Yan Xiong, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 246 days.

(21) Appl. No.: 16/605,566

(22) PCT Filed: Dec. 20, 2017

(86) PCT No.: PCT/US2017/067607
§ 371 (c)(1),
(2) Date: Oct. 16, 2019

(87) PCT Pub. No.: WO2019/125434
PCT Pub. Date: Jun. 27, 2019

(65) Prior Publication Data
US 2021/0294666 A1  Sep. 23, 2021

(51) Int. Cl.
*G06F 15/16* (2006.01)
*G06F 9/50* (2006.01)
(Continued)

(52) U.S. Cl.
CPC .......... *G06F 9/5077* (2013.01); *G06F 9/466* (2013.01); *H04L 29/08135* (2013.01);
(Continued)

(58) Field of Classification Search
CPC ...................................................... H04L 12/14
See application file for complete search history.

(56) References Cited

U.S. PATENT DOCUMENTS 8,478,644 B1    7/2013  Baluja
8,645,190 B1 *  2/2014  Juda ...................... G06Q 30/02
                                                        705/7.35
(Continued)

FOREIGN PATENT DOCUMENTS

CN    109377273    2/2018
JP    2005190005   7/2005
(Continued)

OTHER PUBLICATIONS

IN Office Action in Indian Appln. No. 201927041747, dated Apr. 17, 2021, 5 pages (with English translation).
(Continued)

*Primary Examiner* — Hieu T Hoang
(74) *Attorney, Agent, or Firm* — Fish & Richardson P.C.

(57) ABSTRACT

Methods, systems, and apparatus, including computer programs encoded on a computer storage medium, for performing a joint simulation for satisfying multiple different coexisting commitments to allocate digital resources. In one aspect, a method includes accessing logged data for prior allocations of digital resources, where the logged data includes at least one property associated with respective allocations of the digital resources. Different allocations of the digital resources included in the logged data are assigned to different ones of the multiple different commitments. For each commitment to allocate digital resources, an expected required resource amount that results in the commitment being allocated at least a specified minimum resource based on the allocations of digital resources of the logged data that were assigned to the multiple different commitments is determined.

19 Claims, 5 Drawing Sheets

(51) Int. Cl.
  G06F 9/46 (2006.01)
  H04L 67/10 (2022.01)
  H04L 47/2425 (2022.01)
  H04L 47/783 (2022.01)
  H04L 67/1074 (2022.01)
  H04L 12/14 (2006.01)

(52) U.S. Cl.
  CPC .......... *H04L 12/14* (2013.01); *H04L 47/2425* (2013.01); *H04L 47/783* (2013.01); *H04L 67/1074* (2013.01)

(56) References Cited

U.S. PATENT DOCUMENTS

| | | | |
|---|---|---|---|
| 9,680,923 | B1 | 6/2017 | Jain et al. |
| 2002/0124246 | A1 | 9/2002 | Kaminsky et al. |
| 2006/0253327 | A1 | 11/2006 | Morris et al. |
| 2008/0243601 | A1 | 10/2008 | Patel et al. |
| 2009/0006266 | A1* | 1/2009 | Hanson ................ G06Q 50/188 705/80 |
| 2009/0271478 | A1* | 10/2009 | Imai ....................... G06Q 10/06 709/203 |
| 2009/0307145 | A1* | 12/2009 | Mesaros ............ G06Q 30/0283 705/80 |
| 2010/0082422 | A1 | 4/2010 | Hailig et al. |
| 2010/0082429 | A1 | 4/2010 | Samdadiya et al. |
| 2010/0082471 | A1* | 4/2010 | Hylton ................... G06Q 40/00 705/35 |
| 2010/0100422 | A1 | 4/2010 | Schwarz |
| 2010/0121671 | A1* | 5/2010 | Boutilier ............ G06Q 30/0275 705/7.33 |
| 2010/0138290 | A1* | 6/2010 | Zschocke ........... G06Q 30/0275 705/14.41 |
| 2013/0132854 | A1* | 5/2013 | Raleigh ................... H04W 4/60 715/738 |
| 2015/0088997 | A1* | 3/2015 | van Dijk ................ G06Q 10/10 709/206 |
| 2015/0127509 | A1* | 5/2015 | Studnitzer ............. G06Q 40/04 705/37 |
| 2015/0127513 | A1* | 5/2015 | Studnitzer ............. G06Q 40/04 705/37 |
| 2016/0337426 | A1* | 11/2016 | Shribman .......... H04N 21/8456 |
| 2018/0012254 | A1* | 1/2018 | Asano ................ G06Q 30/0251 |
| 2018/0047099 | A1* | 2/2018 | Bonig ................... G06Q 40/04 |
| 2018/0357678 | A1* | 12/2018 | Diorio ................ G06Q 30/0275 |

FOREIGN PATENT DOCUMENTS

| | | |
|---|---|---|
| JP | 2011238262 | 11/2011 |
| JP | 2014052920 | 3/2014 |
| JP | 2014182447 | 9/2014 |
| JP | 2017004518 | 1/2017 |
| KR | 20070006756 | 1/2007 |
| KR | 20070049232 | 5/2007 |
| KR | 20080091189 | 10/2008 |
| KR | 20190094235 | 8/2019 |

OTHER PUBLICATIONS

KR Office Action in Korean Appln. No. 10-2019-7032190, dated May 18, 2021, 11 pages (with English translation).

PCT International Search Report and Written Opinion in International Application No. PCT/US2017/067607, dated Sep. 12, 2018, 12 pages.

JP Office Action in Japanese Appln. No. 2019-561981, dated Mar. 15, 2021, 6 pages (with English translation).

KR Office Action in Korean Appln. No. 10-2019-7032190, dated Dec. 1, 2020, 10 pages (with English translation).

PCT International Preliminary Report on Patentability in International Application No. PCT/US2017/067607, dated Jul. 2, 2020, 7 pages.

\* cited by examiner

JOINT TRANSMISSION COMMITMENT SIMULATION

CROSS-REFERENCE TO RELATED APPLICATION

This application is a National Stage Application under 35 U.S.C. § 371 and claims the benefit of International Application No. PCT/US2017/067607, filed Dec. 20, 2017, the disclosure of which is incorporated herein by reference.

BACKGROUND

This specification relates to allocation of digital resources.

The Internet facilitates the exchange of information between users across the globe. This exchange of information enables one or more digital resources to be accessed by multiple distributed users such that digital resources and content can be shared by the users. For example, in a cloud computing environment access may be provided to multiple users to a shared pool of configurable system resources and services such as data storage and data processing. Additionally, content from multiple different providers can be integrated into a single electronic document to create a composite document. For example, a portion of the content included in the electronic document may be selected (or specified) by a publisher of the electronic document. A different portion of content (e.g., third party content) can be provided by a third party (e.g., an entity that is not a publisher of the electronic document).

SUMMARY

In general, in a first aspect, the subject matter described in this specification can be embodied in methods that include the actions of: accessing logged data for prior allocations of digital resources, wherein the logged data includes at least one property associated with respective allocations of the digital resources; assigning different allocations of the digital resources included in the logged data to different ones of the multiple different commitments, including: for a particular allocation of digital resources in the logged data, assigning the particular allocation of digital resources to a given commitment to allocate digital resources where properties of the commitment to allocate the digital resources match properties of the particular allocation of the digital resources; and for each commitment to allocate digital resources of the multiple different commitments, determining an expected required resource that results in the commitment to allocate digital resources being allocated at least a specified minimum resource based on the allocations of digital resources of the logged data that were assigned to the multiple different commitments.

These and other embodiments can each optionally include one or more of the following features.

In some implementations, assigning the particular allocation of digital resources to a given commitment to allocate digital resources includes: identifying multiple commitments to allocate digital resources where (i) the distribution criteria of the commitment matches the criteria that triggered the particular allocation of the digital resources, and (ii) a time period for completing the commitment matches the allocation time of the particular the particular allocation of digital resources; and selecting the given commitment from the identified commitments in accordance with a probability distribution over the identified commitments. The probability distribution can be parametrized by the specified minimum numbers of allocations of digital resources over the time periods for completing each of the identified commitments.

In some implementations, assigning the particular allocation of digital resources to a given commitment to allocate digital resources can include: determining that the criteria that triggered the particular allocation of the digital resources include a particular distribution criterion; determining a first number of allocations of digital resources that were previously assigned to the given commitment; determining a second number of allocations of digital resources that were previously assigned to the given commitment because the distribution criteria that triggered the allocations of the digital resources include the particular distribution criterion; determining that the second number does not exceed a threshold based on the first number.

In some implementations, the distribution criteria that triggered allocations of digital resources include characteristics of devices that were allocated the digital resources.

In some implementations, the method includes determining, for each allocation of digital resources, that transmission criteria of the commitment overlap with a set of transmission criteria of at least one different commitment to allocate digital resources.

Other embodiments of this aspect include corresponding systems, apparatus, and computer programs, configured to perform the actions of the methods, encoded on computer storage devices.

In general, in a second aspect, the subject matter described in this specification can be embodied in methods that include the actions of: accessing logged data for prior transmissions of digital components, wherein the logged data includes transmission scores for the transmissions of digital components, distribution criteria that triggered the transmissions of the digital components, and delivery times of the transmissions of the digital components; assigning different digital component transmissions included in the logged data to different ones of the multiple different transmission commitments, including: for a particular digital component transmission in the logged data, assigning the particular digital component transmission to a given transmission commitment where distribution criteria of the given transmission commitment match distribution criteria that triggered the particular digital component transmission and a time period for completing the given transmission commitment matches the delivery time of the particular digital component transmission; and for each digital component transmission commitment of the multiple different digital component transmission commitments, determining an expected cost that results in the digital component transmission commitment being allocated at least a specified minimum number of digital component transmissions over the time period for completing the digital component transmission commitment based on the digital component transmissions of the logged data that were assigned to the multiple different transmission commitments.

These and other embodiments can each optionally include one or more of the following features.

In some implementations, assigning the particular digital component transmission to a given transmission commitment can include: identifying multiple transmission commitments where (i) the distribution criteria of the transmission commitment matches the distribution criteria that triggered the particular digital component transmission, and (ii) a time period for completing the transmission commitment matches the delivery time of the particular digital component transmission; and selecting the given transmission commitment from the identified transmission commitments in accordance with a probability distribution over the identified transmission commitments, wherein the probability distribution is parametrized by the specified minimum numbers of digital component transmissions over the time periods for completing each of the identified digital component transmission commitments.

In some implementations, assigning the particular digital component transmission to a given transmission commitment can include: determining that the distribution criteria that triggered the transmission of the particular digital component include a particular distribution criterion; determining a first number of digital component transmissions that were previously assigned to the given transmission commitment; determining a second number of digital component transmissions that were previously assigned to the given transmission commitment because the distribution criteria that triggered the transmissions of the digital components include the particular distribution criterion; determining that the second number does not exceed a threshold based on the first number.

In some implementations, the distribution criteria that triggered the transmissions of the digital components include one or both of: characteristics of electronic documents where the digital components were presented after transmission of the digital components; and characteristics of devices where the electronic documents were displayed.

In some implementations, the method can include: determining, for each digital component transmission commitment, that transmission criteria of the digital component transmission commitment overlap with a set of transmission criteria of at least one different digital component transmission commitment.

In some implementations, the method can include: determining a transfer cost for each digital component transmission commitment of a first subset of the multiple different digital component transmission commitments, including computing a difference between the determined expected cost of the digital component transmission commitment and an initial expected cost of the digital component transmission commitment; for a different digital component transmission commitment not included in the first subset of the multiple different digital component transmission commitments: determining a risk factor for the different digital component transmission commitment; determining a fixed amount to be charged for the different digital component transmission commitment based on: (i) the risk factor for the different digital component transmission commitment, (ii) the expected cost of the different digital component transmission commitment, and (iii) the determined transfer costs for the digital component transmission commitments of the first subset of the multiple different digital component transmission commitments.

In some implementations, the method can include: after completion of the different digital component transmission commitment, determining a gain of the different digital component transmission commitment based on: (i) the risk factor for the different digital component transmission commitment, (ii) the expected cost of the different digital component transmission commitment, and (iii) the actual cost of the different digital component transmission commitment.

In some implementations, the method can include: adjusting the time period for completing each transmission commitment of the first subset of the multiple different transmission commitments to be the same as the time period for completing the different transmission commitment.

In some implementations, the risk factor for the different transmission commitment is based at least in part on a measure of variance of the transmission scores for the transmissions of digital components of the logged data that were assigned to the different digital component transmission commitment.

In some implementations, the risk factor for the different transmission commitment is based at least in part on the time period for completing the different transmission commitment.

In some implementations, the method can include: determining a total number of digital component transmissions included in the logged data where the distribution criteria that triggered the transmission of the digital component matches transmission criteria of the different transmission commitment and the delivery time of the digital component transmission matches the time period for completing the different transmission commitment; determining that the specified minimum number of digital component transmissions over the time period for completing the different transmission commitment exceeds a threshold based on the total number; and determining the fixed amount to be charged for the different transmission commitment to be invalid.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter described in this document enables expected resources required to jointly complete one or more commitments to provide resources (e.g., an agreement to provide computing resources such as data processing by way of a distributed computing environment or a cloud computing environment, or to transmit one or more digital components for a third-party at least a specified minimum number of times within a specified period of time) to be determined. When multiple different commitments overlap in time the co-existence of these commitments can affect the resources required during that time period, so by taking into account each other commitment in determining of the resources required to satisfy a given commitment, a more accurate estimate of the expected resources required to complete each commitment is determined.

It can be difficult to accurately predict the resources required to complete a proposed commitment due to the nature of use of digital resources and because the total resources required to meet the proposed commitment may be affected by jointly servicing existing commitments (i.e., that may compete with the proposed commitment). For example, in a computing environment in which a resource is allocated to multiple users, utilization of the resource by different users and required allocation of resource to different users will typically vary across the period of a commitment to provide the resource. The subject matter described in this document enables an amount of resources required for completion of a proposed commitment to provide digital resources to be determined based on properties associated with the commitment to provide digital resources.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
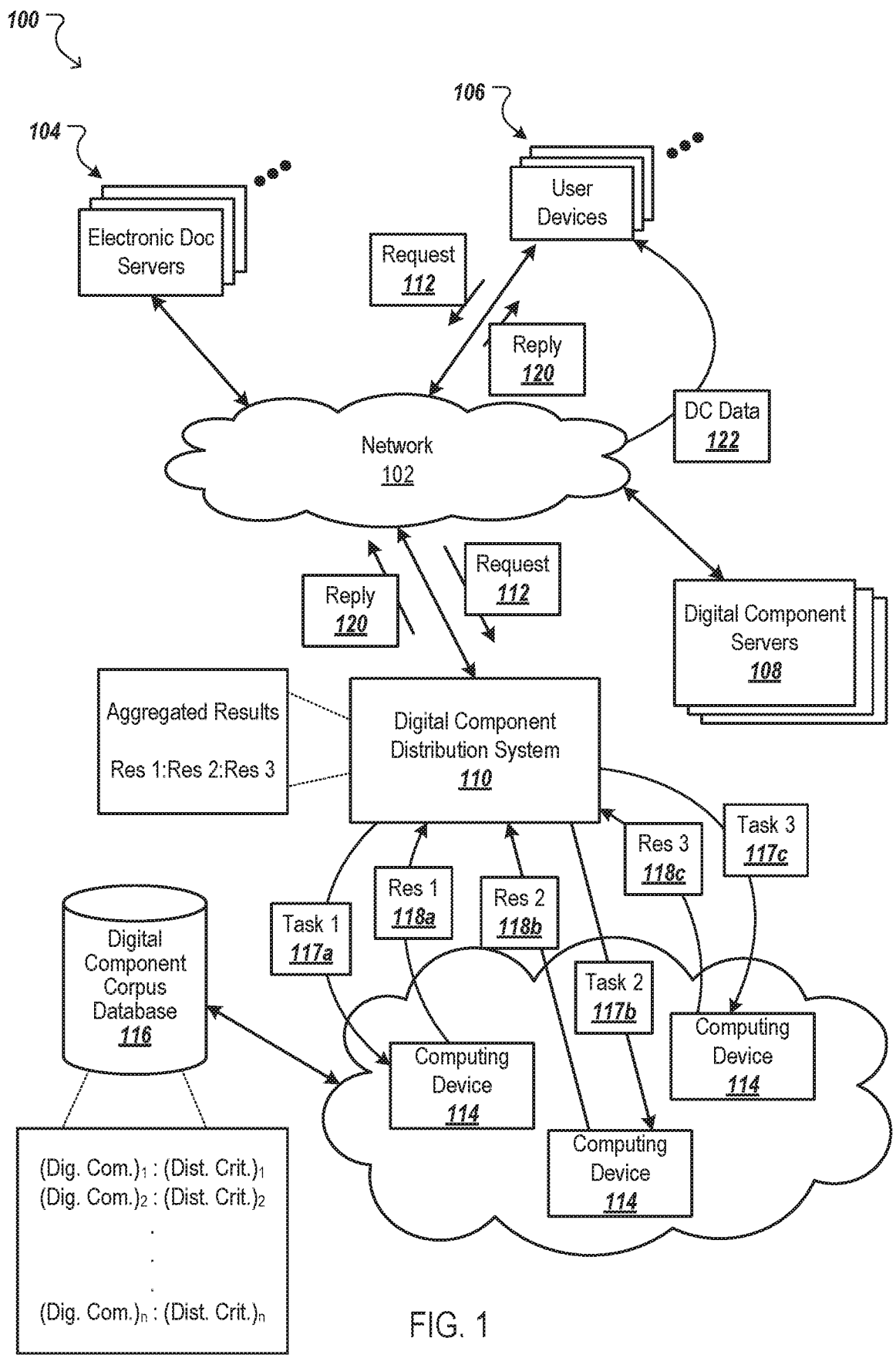
FIG. 1 is a block diagram of an example environment in which digital components are distributed.

This document discloses methods, systems, apparatus, and computer readable media for performing a joint simulation to determine an expected required resource for completing a commitment to provide the resource among a set of multiple different coexisting commitments to provide a resource. As used throughout this document, a commitment refers to an agreement to provide allocation of a digital resource. The use of commitments is generally described below with reference to digital component transmission commitments, which is also referred to as a transmission commitment for brevity, which refers to an agreement to transmit one or more digital components for a third-party at least a specified minimum number of times within a specified amount of time. In some implementations, the third-party submits a fixed amount for the transmission of the digital components with specified distribution criteria. It will be appreciated that the techniques described below are also applicable to commitments to provide a resource other than a digital component transmission commitment such as commitments to provide resources in a cloud computing environment. The resource may, for example, be a data storage resource or data processing resource.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component.

As described in more detail below, an amount of resource is determined using a simulation technique, which takes into account information about historical allocations of a resource such as historical transmissions of digital components, as well as any other pre-existing transmission commitments that have already been made. For example, the fixed amount required for completion of a proposed transmission commitment that would coexist with one or more existing transmission commitments can be determined based on the results of a joint simulation that provides the expected costs of the proposed transmission commitment and the existing transmission commitments. As discussed below, the simulation can consider transfer costs, e.g., changes in the expected cost of completing the existing transmission commitments jointly with the proposed transmission commitment, and a risk factor when determining the expected cost of the proposed transmission commitment. The risk factor can be based on an uncertainty of the accuracy of the expected cost that will be required to complete the proposed transmission commitment jointly with the existing transmission commitments. More specifically, because of the dynamic nature of future transmission costs, the risk factor quantifies the uncertainty associated with predicting future transmission costs.

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, user devices 106, digital component servers 108, and a digital component distribution system 110. The example environment 100 may include many different electronic document servers 104, user devices 106, and digital component servers 108.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to user devices 106 by electronic document servers 104. For example, the electronic document servers 104 can include servers that host publisher websites. In this example, the user device 106 can initiate a request for a given publisher webpage, and to the electronic server 104 that hosts the given publisher webpage can respond to the request by sending machine executable instructions that initiate presentation of the given webpage at the user device 106.

In another example, the electronic document servers 104 can include app servers from which user devices 106 can download apps. In this example, the user device 106 can download files required to install an app at the user device 106, and then execute the downloaded app locally.

Electronic documents can include a variety of content. For example, electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into the given electronic document to create a composite electronic document including the content obtained from the data source.

In some situations, a given electronic document can include a digital component tag or digital component script that references the digital component distribution system 110. In these situations, the digital component tag or digital component script is executed by the user device 106 when the given electronic document is processed by the user device 106. Execution of the digital component tag or digital component script configures the user device 106 to generate a request for digital components 112, which is transmitted over the network 102 to the digital component distribution system 110. For example, the digital component tag or digital component script can enable the user device 106 to generate packetized data request including a header and payload data. The request 112 can include data such as a name (or network location) of a server from which the digital components are being requested, a name (or network location) of the requesting device (e.g., the user device 106), and/or information that the digital component distribution system 110 can use to select digital components provided in response to the request. The request 112 is transmitted, by the user device, over the network (e.g., a telecommunications network) to a server of the digital component distribution system 110.

The request 112 can include data specifying the electronic document and characteristics of locations at which digital components can be presented. For example, data specifying a reference (e.g., URL) to an electronic document (e.g., webpage) in which the digital components will be presented, available locations of the electronic documents that are available to present digital components, sizes of the available locations, and/or media types that are eligible for presentation in the locations can be provided to the content distribution system 110. Similarly, data specifying keywords associated with the electronic document ("document keywords") or entities (e.g., people, places, or things) that are referenced by the electronic document can also be included in the request 112 (e.g., as payload data) and provided to the content distribution system 110 to facilitate identification of digital components that are eligible for presentation with the electronic document.

Requests 112 can also include data related to other information, such as information that the user has provided, geographic information indicating a state or region from which the request was submitted, or other information that provides context for the environment in which the digital components will be displayed (e.g., a type of device at which the digital components will be displayed, such as a mobile device or tablet device). Requests 112 can be transmitted, for example, over a packetized network, and the requests 112 themselves can be formatted as packetized data having a header and payload data. The header can specify a destination of the packet and the payload data can include any of the information discussed above.

The digital component distribution system 110 chooses digital components that will be presented with the given electronic document in response to receiving the request 112 and/or using information included in the request 112. In some implementations, the digital component are selected in less than a second to avoid errors that could be caused by delayed selection of the digital components. For example, delays in providing digital components in response to a request 112 can result in page load errors at the user device 106 or cause portions of the electronic document remain unpopulated even after other portions of the electronic document are presented at the user device 106. Also, as the delay in providing digital components to the user device 106 increases, it is more likely that the electronic document will no longer be presented at the user device 106 when the digital components, thereby negatively impacting a user's experience with the electronic document. Further, delays in providing the digital components can result in a failed delivery of the digital components, for example, if the electronic document is no longer presented at the user device 106 when the digital components are provided.

In some implementations, the digital component distribution system 110 includes a set of multiple computing devices 114 that are used to identify and distribute digital components in response to requests 112. The set of multiple computing devices 114 operate together to identify a set of digital components that are eligible to be presented in the electronic document from among a corpus of millions of available digital components. The millions of available digital components can be indexed, for example, in a digital component corpus database 116. Each digital component index entry can reference the corresponding digital component and/or include distribution criteria that condition the distribution of the corresponding digital component.

Distribution criteria for digital components can include characteristics of electronic documents where the digital components are presented after transmission and characteristics of devices where the electronic documents are displayed after transmission. In some implementations, the distribution criteria for a particular digital component can include distribution keywords that must be matched (e.g., by electronic documents or terms specified in the request 112) in order for the digital component to be eligible for presentation. The distribution criteria can also require that the request 112 include information specifying a particular geographic region (e.g., country or state) and/or information specifying that the request 112 originated at a particular type of user device (e.g., mobile device or tablet device) in order for the digital component to be eligible for presentation.

The identification of the eligible digital components can be segmented into multiple tasks that are then assigned among computing devices within the set of multiple computing devices 114. For example, different computing devices in the set 114 can each analyze a different portion of the digital component corpus database 116 to identify various digital components having distribution criteria that match information included in the request 112. In some implementations, each given computing device in the set 114 can analyze a different data dimension (or set of dimensions) and pass results 118 of the analysis back to the digital component distribution system 110. For example, the results 118 provided by each of the computing devices in the set may identify a subset of digital components that are eligible for distribution in response to the request and/or a subset of the digital components that have certain distribution criteria or attributes.

The digital component distribution system 110 aggregates the results 118 received from the set of multiple computing devices 114 and uses information associated with the aggregated results to select one or more digital components that will be provided in response to the request 112. For example, the digital component distribution system 110 can select a set of winning digital component based on the outcome of a digital component selection process. In turn, the digital component distribution system 110 can generate and transmit, over the network 102, reply data 120 that enable the user device 106 to integrate the set of winning digital components into the given electronic document, such that the set of winning digital components and the content of the electronic document are presented together at a display of the user device 106.

In some implementations, the user device 106 executes instructions included in the reply data 120, which configures and enables the user device 106 to obtain the set of winning digital components from one or more digital component servers. For example, the instructions in the reply data 120 can include a network location (e.g., a Uniform Resource Locator (URL)) and a script that causes the user device 106 to request a given winning digital component from the digital component server 108. In response to the request, the digital component server 108 will transmit, to the user device 106, digital component data 122 that causes the given winning digital component to be presented at the user device 106.

The digital component selection process of the digital component distribution system 110 can be a process that identifies the winning digital components and a cost for the transmission of the winning digital components based, at least in part, on bids associated with the digital components. For example, the winning digital component for each presentation location may be a digital component having a highest bid (e.g., relative to bids of other digital components that have not already been selected as winning digital components for another presentation location in a given electronic document). As another example, the winning digital component for each presentation location may be a digital component having a highest selection score (e.g., relative to selection scores of other digital components that have not already been selected as winning digital components for another presentation location in a given electronic document).

The selection score for each digital component can be, for example, determined based on a function of the bid corresponding to the digital component and/or one or more other parameters. For example, the bid for each digital component can be scaled by some attribute value that is specific to that digital component to arrive at the selection score for that digital component. The attribute value used to scale the digital component bids can be a performance (or quality) measure selected, for example, by an administrator of the content distribution system 110.

In some situations, a third-party may want to have one or more digital components transmitted to user devices a specified number of times for a fixed amount. However, it can be difficult to accurately predict a future amount that will be required to complete the specified number of transmissions due to the dynamic nature of the amount required for transmissions over time. Additionally, when multiple different transmission commitments overlap in time the co-existence of these transmission commitments can affect the amount required for transmission during that time period. The techniques discussed below address these difficulties, for example, by accounting for known transmission commitments when determining a fixed amount for completion of a proposed transmission commitment that overlaps in time with existing transmission commitments based on the results of a joint simulation. Furthermore, the techniques discussed below perform a normalization routine to ensure that each transmission commitment receives an appropriate amount of credit for its contribution to the gain (e.g., revenue or profit) made by the system when there are multiple co-existing transmission commitments being serviced at the same time. In some implementations, the digital component distribution system 110 includes a simulation apparatus (discussed with reference to FIG. 2), which implements the techniques discussed throughout this document.

Figure 2:
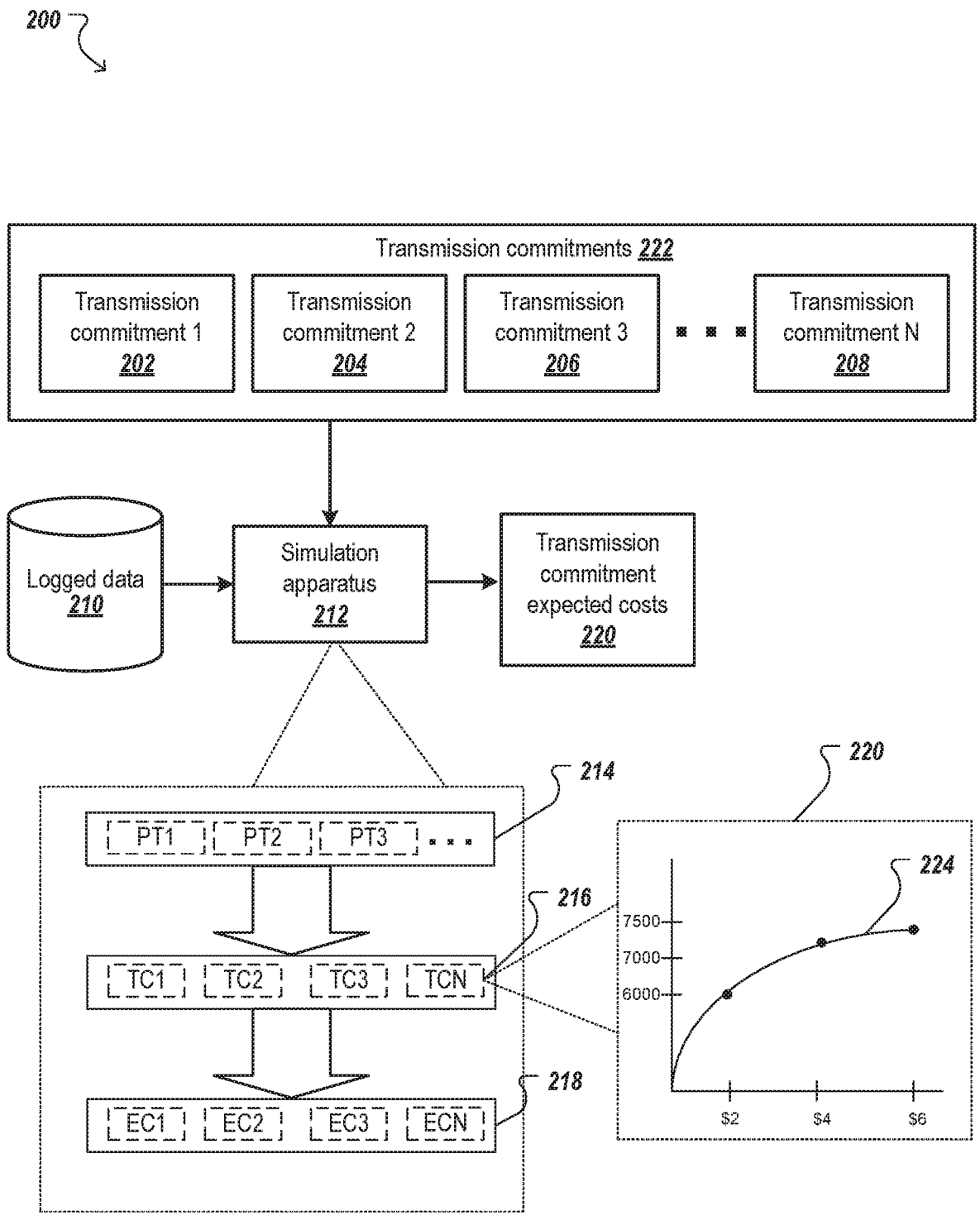
FIG. 2 is a block diagram of an example data flow for performing a joint simulation to determine an expected cost for each of multiple different transmission commitments.

FIG. 2 is a block diagram of an example data flow for determining an expected cost for each of multiple different transmission commitments. The data flow 200 begins with a simulation apparatus 212 receiving a set of multiple different transmission commitments 222, which can include existing transmission commitments, proposed transmission commitments, or both. Each of the multiple different transmission commitments 202, 204, 206, and 208 are associated with a respective set of transmission commitment terms specified by a third-party. Transmission commitment terms include a third-party digital component that is to be transmitted, respective distribution criteria that are used to trigger transmission of the third-party digital components, a respective minimum number of transmissions that are being requested, and a respective future time period (or end date) for completing the transmissions.

In some situations, the respective distribution criteria and/or the respective time periods for completing the transmissions of the third-party digital components of the transmission commitments 222 may overlap with one another. Distribution criteria of a first transmission commitment are considered to overlap with distribution criteria of a second transmission commitment if the distribution criteria of the first transmission commitment are identical to the distribution criteria of the second transmission commitment. Time periods are considered to overlap when they each include at least some of the same time period. For example, two different digital components that are to be transmitted for presentation on a same web page (or same type of web page) and to users having a specific attribute (e.g., interest), can be considered to have overlapping distribution criteria. Meanwhile, two transmission commitments that are being serviced on a same hour, day, week, or month are considered to have overlapping time periods.

Each of the transmission commitments 202, 204, 206, and 208 may be processed at different times, as they are received from third-parties. For example, transmission commitment 202 may be processed at time t1, while transmission commitment 204 may be processed at time t2, which is after t1. Meanwhile, transmission commitments 206 and 208, as well as any other transmission commitments, can be processed at later times (e.g., after processing of transmission commitment 202, transmission commitment 204, and/or any other transmission commitment). The processing of transmission commitment 202 prior to processing of any of the other transmission commitments 204, 206, and/or 208 means that the expected cost determined for the transmission commitment 202 will be determined by the simulation apparatus 212 prior to any indication that transmission commitments 204, 206, or 208 will be processed. As such, the expected cost that the simulation apparatus 212 determines based on the characteristics of transmission commitment 202 will not take into account transmission commitments 204, 206, or 208. Similarly, if the transmission commitment 204 is processed by the simulation apparatus 212 prior to processing transmission commitments 206 and/or 208, then expected costs determined for the transmission commitments 202 and 204 will be determined by the simulation apparatus 212 without taking into account transmission commitments 206 or 208.

The simulation apparatus 212 accesses logged data 210 corresponding to prior transmissions 214 (e.g., PT1, PT2, PT3, ... ) of digital components, i.e., prior transmissions of digital components based on the digital components having been selected for transmission by the distribution system 110 in response to requests 112 for digital components. The logged data includes transmission scores for the prior transmissions, distribution criteria for the prior transmissions, and delivery times of the prior transmissions. The transmission score for a prior transmission refers to a bid or selection score of a winning digital component that was selected for transmission in response to the digital component request that triggered the prior transmission. The distribution criteria for a prior transmission refers to the distribution criteria of the winning digital component that was selected for transmission in response to the digital component request that triggered the transmission. The delivery time of a prior transmission refers to the time that the digital component selected for transmission in response to the request that triggered the prior transmission was transmitted, for example to be integrated with an electronic document for presentation at a user device.

The simulation system 212 assigns prior transmissions 214 of the logged data 210 to respective transmission commitments 216 (e.g., TC1, TC2, TC3, ..., TCN), subject to assignment constraints. In particular, the assignment constraints require that the distribution criteria of a prior transmission assigned to a respective transmission commitment match the distribution criteria of the respective transmission commitment, and that the delivery time of a prior transmission assigned to a respective transmission commitment matches the time period for completing the respective transmission commitment. Moreover, the assignment constraints may additionally include a diversity constraint requiring that, for any particular value of a distribution criterion, no more than a fixed fraction of the prior transmissions assigned to a given transmission commitment specify the particular value of the distribution criterion. For example, the diversity constraint may require that no more than a fixed fraction of the prior transmissions assigned to a given transmission commitment include a distribution criterion specifying any particular website on which the digital component is presented. Diversity constraints can increase the robustness and stability of the expected costs generated by the simulation system 212. For example, the previously described diversity constraint on the websites on which the digital components are presented serves to mitigate against the risk of any particular website being unexpectedly unavailable during the time periods for completing the transmission commitments 222, which would prevent distribution of digital components for presentation with that particular website.

Based on the prior transmissions 214 assigned to each transmission commitment 216, the simulation system 212 obtains, for each transmission commitment, a transmission score—transmission rate relationship between transmission scores and corresponding expected numbers of transmissions of the third-party digital component of the transmission commitment over the time period for completing the transmission commitment. FIG. 2 includes an example such relationship 220 for TCN (i.e. the N-th transmission commitment).

The transmission score—transmission rate relationship 220 shows various transmission scores (in this case, bids) along the x-axis, and shows various expected numbers of transmissions along the y-axis. In particular, the transmission score transmission rate relationship 220 shows bids of $2, $4, and $6 along the x-axis, and shows expected numbers of transmissions of 6000, 7000, and 7500 along the y-axis. The curve 224 passes through points corresponding to $2 bid and 6000 transmissions, $4 bid and 7000 transmissions, and $6 bid and 7500 transmissions. These points and other points along the curve 224 correspond to the expected numbers of transmissions of the third-party digital component of the transmission commitment when the third-party digital component is associated with particular transmission scores (e.g., bids). Once the transmission score transmission rate relationships have been created for each of the transmission commitments 216, they can be used to identify the expected costs 218 (e.g., EC1, EC2, EC3, ..., ECN) for jointly completing each of the transmission commitments, as will be described in more detail below.

Figure 3:
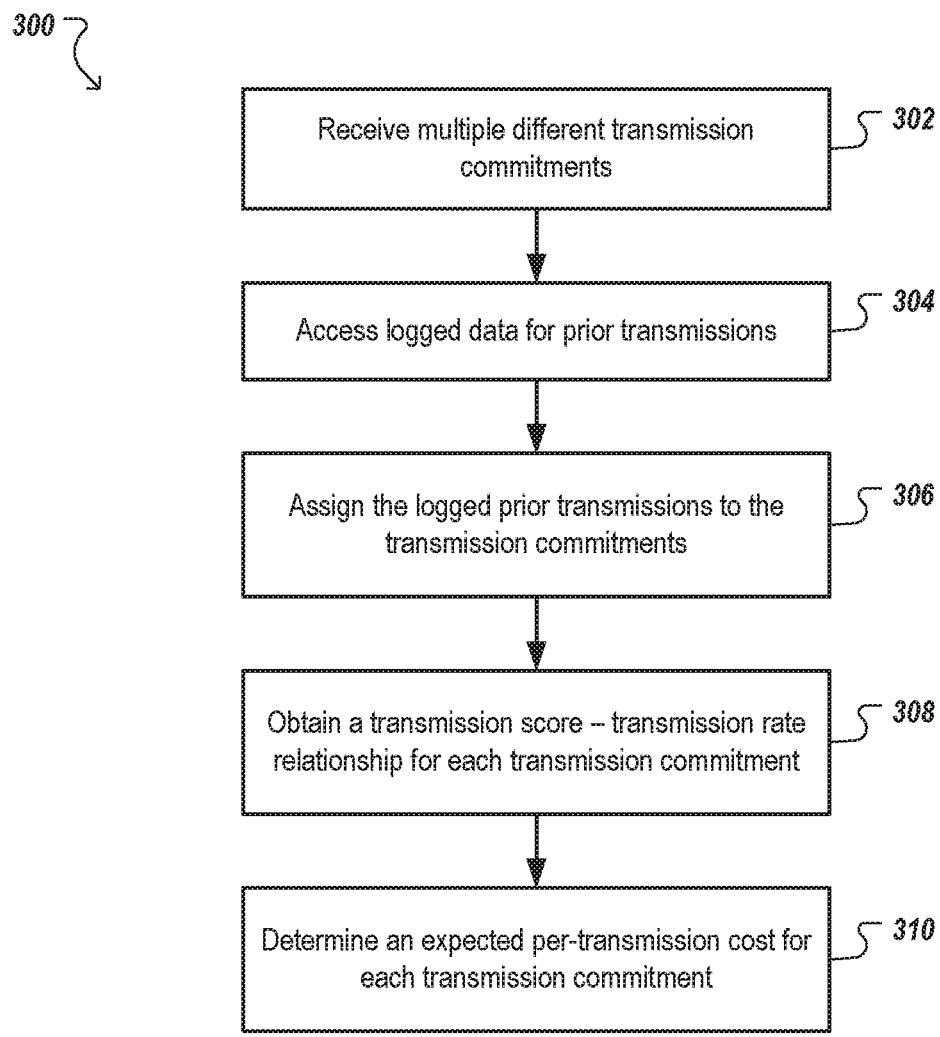
FIG. 3 is a flow diagram of an example process for performing a joint simulation to determine an expected cost for each of multiple different transmission commitments.

FIG. 3 is a flow diagram of an example process 300 for performing a joint simulation to determine an expected cost for completing each transmission commitment of a set of multiple different coexisting transmission commitments. For convenience, the process 300 will be described as being performed by an apparatus including one or more computers located in one or more locations. For example, a simulation apparatus, e.g., the simulation apparatus 212 of FIG. 2, appropriately programmed in accordance with this specification, can perform the process 300.

The apparatus receives a set of multiple different transmission commitments 222 (302). Each of the multiple different transmission commitments are associated with a respective set of transmission commitment terms. Transmission commitment terms include a third-party digital component that is to be transmitted, respective distribution criteria that are used to trigger transmission of the third-party digital components, a respective minimum number of transmissions that are being requested, and a respective future time period (or end date) for completing the transmissions. In some situations, the respective distribution criteria and/or the respective time periods for completing the transmissions of the third-party digital components of the transmission commitments 222 may overlap with one another.

The apparatus accesses logged data 210 corresponding to prior transmissions 214 of digital components (304). In some implementations, the prior transmissions are prior transmissions of digital components based on the digital components having been selected for transmission by the distribution system 110 in response to requests 112 for digital components. The logged data includes transmission scores for the prior transmissions, distribution criteria for the prior transmissions, and delivery times of the prior transmissions.

The apparatus assigns prior transmissions 214 of the logged data 210 to respective transmission commitments 216, subject to assignment constraints (306). An example process for assigning a particular prior transmission to a transmission commitment is described with reference to FIG. 4.

The apparatus obtains, for each transmission commitment, a transmission score—transmission rate relationship (308). In some implementations, the transmission score—transmission rate relationship provides a relationship between transmission scores and corresponding expected numbers of transmissions of the third-party digital component of the transmission commitment over the time period for completing the transmission commitment (step 308). FIG. 2 includes an example relationship 220 for TCN (i.e., the N-th transmission commitment). For a particular transmission score and a particular transmission commitment, the apparatus can obtain the corresponding expected number of transmissions of the particular third-party digital component by determining the number of prior transmissions assigned to the particular transmission commitment for which the particular third-party digital component would have been selected for transmission had it been associated with the particular transmission score and included in the digital component selection process. In some cases, the particular third-party digital component would have been selected for transmission if the particular transmission score is greater than the transmission score of the prior transmission (i.e. the transmission score associated with the winning digital component that was actually previously selected for transmission in response to the digital component request that triggered the prior transmission).

In some cases, the apparatus obtains the transmission score—transmission rate relationship for a particular transmission commitment by first determining the expected number of transmissions of the particular third-party digital component for each of multiple particular transmission scores (e.g., determining points on the curve 224), as described above, and then extrapolating the rest of the transmission score—transmission rate relationship from these data points. For example, rest of the transmission score—transmission rate relationship can be extrapolated by fitting (e.g., least squares fitting) a parametric function (e.g., a linear or quadratic function) to the data points. In some implementations, the multiple particular transmission scores from which the transmission score—transmission rate relationship is extrapolated are selected to uniformly subdivide the range of the transmission scores of the prior transmissions assigned to the particular transmission commitment.

The apparatus determines an expected cost of each transmission commitment using the transmission—score transmission rate relationships determined for each transmission commitment (310). The expected cost of a transmission commitment refers to an expected amount of compensation that must be provided (e.g., to publishers of electronic documents where the third-party digital components are integrated for presentation) by the distribution system for transmission of the third-party digital component of the transmission commitment at least the minimum number of times specified in the terms of the transmission commitment.

For a particular transmission commitment, the apparatus uses the transmission score—transmission rate relationship of the particular transmission commitment to determine a particular transmission score such that the corresponding expected number of transmissions is at least as great as the minimum number of transmissions specified in the terms of the particular transmission commitment. The apparatus determines the expected cost as the amount of compensation that would have been provided if the particular digital component, associated with the particular transmission score, had been included in the digital component selection process for each prior transmission assigned to the particular transmission commitment. In some implementations, the amount of compensation that must be provided for transmission of a digital component is determined based on the transmission score of the digital component that is selected for transmission. In these implementations, the apparatus may determine the expected cost of the particular transmission commitment as a function of the product of the particular transmission score and the minimum number of transmissions specified in the terms of the transmission commitment. In some other implementations, the amount of compensation that must be provided for transmission of a digital component is determined based on the second-highest transmission score of the transmission scores of digital components included in the digital component selection process. In these implementations, the apparatus may determine the expected cost of the particular transmission commitment as a function of sum of the transmission scores of the prior transmissions assigned to the particular transmission commitment that are less than the particular transmission score.

Figure 4:
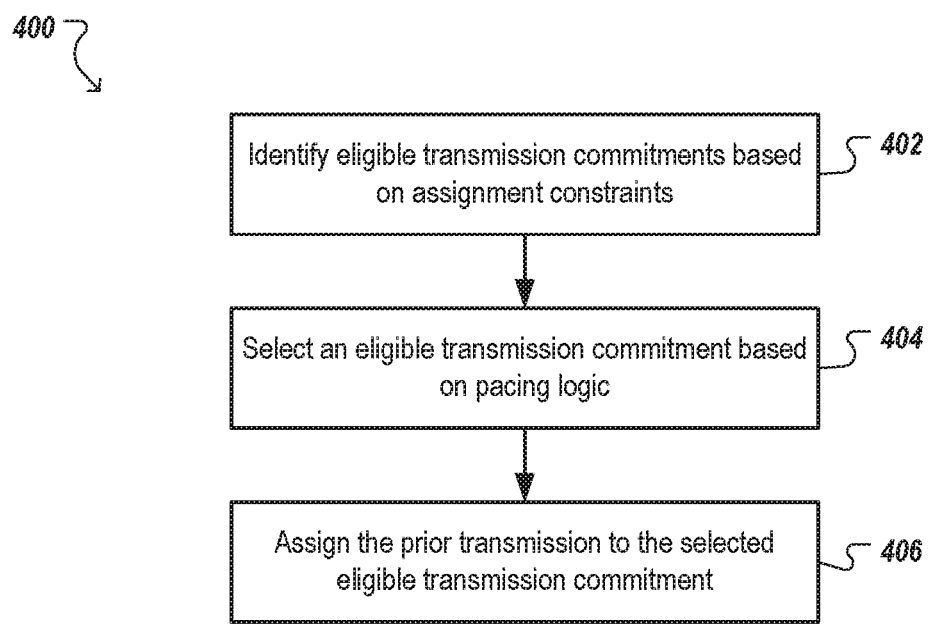
FIG. 4 is a flow diagram of an example process for assigning a particular prior transmission to a transmission commitment in a simulation system.

FIG. 4 is a flow diagram of an example process 400 for assigning a particular prior transmission to a transmission commitment. For convenience, the process 400 will be described as being performed by an apparatus including one or more computers located in one or more locations. For example, a simulation apparatus, e.g., the simulation apparatus 212 of FIG. 2, appropriately programmed in accordance with this specification, can perform the process 400.

The apparatus identifies transmission commitments that are eligible to receive assignment of the particular prior transmission according to assignment constraints (402). The assignment constraints specify that the particular prior transmission can be assigned to a particular transmission commitment only when the distribution criteria of the particular prior transmission match the distribution criteria of the particular transmission commitment, and the delivery time of the particular prior transmission matches the time period for completing the particular transmission commitment.

In some implementations, the distribution criteria of a prior transmission are said to match the distribution criteria of a transmission commitment if the distribution criteria of the prior transmission are identical to the distribution criteria of the transmission commitment. In some other implementations, the distribution criteria of a prior transmission are said to match the distribution criteria of a transmission commitment if the distribution criteria of the transmission commitment are included in the distribution criteria of the prior transmission. For example, distribution criteria of a prior transmission specifying that the digital component must (at the time it was transmitted) be presented on a website of a particular category (e.g. a sports news website) and that the website must contain a specific keyword would match distribution criteria of a transmission commitment specifying only that the digital components must be presented on a website of the particular category.

In some implementations, the delivery time of a prior transmission is said to match the time period for completing a transmission commitment when the delivery time of the prior transmission (e.g., in the reference time frame of the logged data) is included in the time period for completing the transmission commitment. For example, the logged data may correspond to prior transmissions over a previous month. In this case, if a prior transmission had a delivery time in the first two weeks of the previous month and the time period for completing a transmission commitment is the next two weeks, then the delivery time of the prior transmission would match the time period for completing the transmission commitment.

The assignment constraints may additionally include a diversity constraint specifying that if the particular prior transmission includes a particular distribution criterion, then the particular prior transmission can only be assigned to a transmission commitment where less than a fixed fraction of the prior transmissions already assigned to the transmission commitment specify the same particular distribution criterion. For example, the particular distribution criterion may specify that the digital component will be presented on a particular website.

The apparatus selects an eligible transmission commitment for assignment of the particular prior transmission based on pacing logic (404). In some implementations, the pacing logic specifies that the particular prior transmission should be assigned to an eligible transmission commitment in accordance with a probability distribution over the eligible transmission commitments. In some cases, the probability distribution is a uniform distribution (i.e., the particular prior transmission is assigned randomly to an eligible transmission commitment). In some cases, the probability distribution may place more weight on transmission commitments where the minimum number of transmissions specified in the terms of the transmission commitment is greater, and less weight on transmission commitments where the minimum number of transmissions specified in the terms of the transmission commitment is lesser. In some cases, the probability distribution may be parametrized by the specified minimum numbers of digital component transmissions for each of the eligible transmission commitments. In some cases, the probability distribution may place more weight on transmission commitments that are farther behind in satisfying the minimum number of transmissions specified in the terms of the transmission commitment, and less weight on transmission commitments that are less far behind in satisfying the minimum number of transmissions specified in the terms of the transmission commitment. A transmission commitment is said to be behind in satisfying the minimum number of transmissions specified in the terms of the transmission commitment if the number of prior transmission assigned to the transmission commitment is less than the minimum number of transmissions specified in the terms of the transmission commitment.

The apparatus assigns the particular prior transmission to the selected eligible transmission commitment (406). The assignment can occur, for example, by storing a reference to the transmission commitment at a memory location that is allocated to the particular prior transmission.

Figure 5:
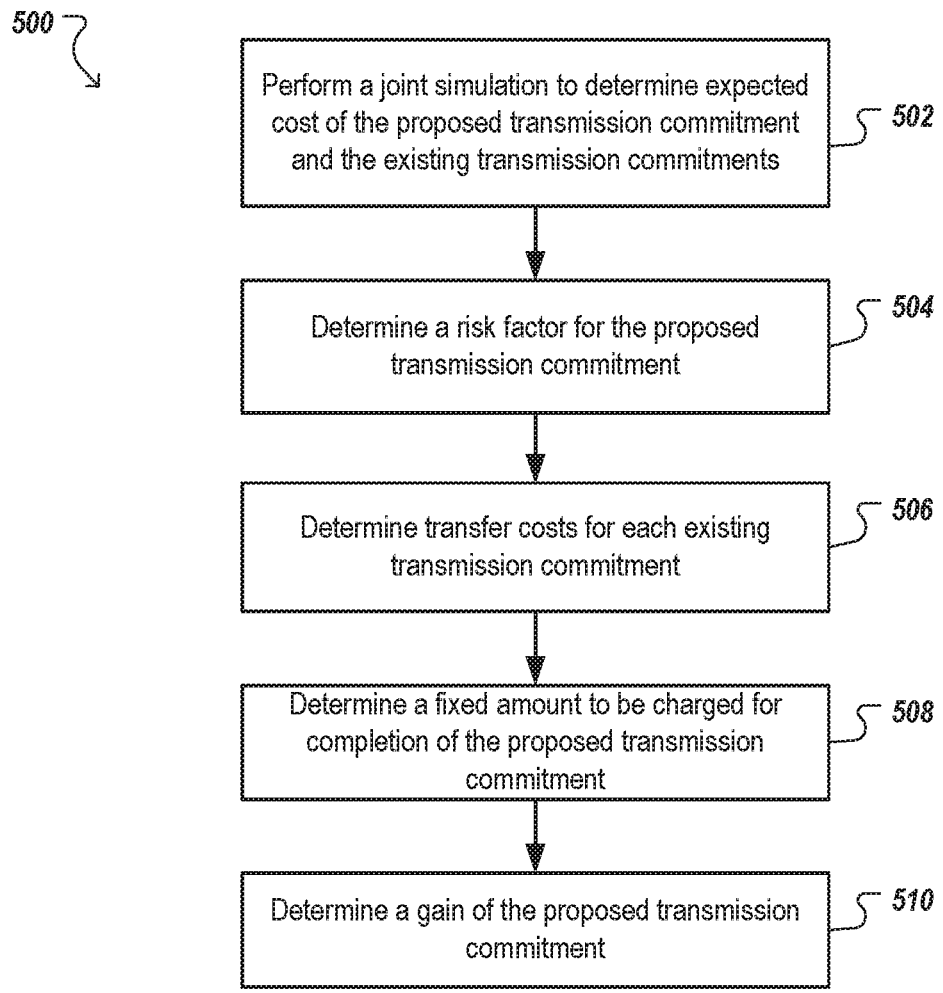
FIG. 5 is a flow diagram of an example process for determining a fixed amount to be charged to a third-party for completion of a proposed transmission commitment and determining the gain of the proposed transmission commitment after completion.

FIG. 5 is a flow diagram of an example process for determining a fixed amount to be charged to a third-party for completion of a proposed transmission commitment and determining the gain of the proposed transmission commitment after completion. For convenience, the process 500 will be described as being performed by a system of one or more computers located in one or more locations.

Each of the existing transmission commitments are associated with a fixed amount to be charged to the respective third party of the transmission commitment. In general, a risk factor is a measure reflecting the uncertainty of predicting the cost of a transmission commitment to be completed in the future due to the dynamic nature of the compensation required for transmissions over time.

The system performs a joint simulation, for example using the simulation apparatus discussed with reference to FIG. 2, to determine an expected cost of the proposed transmission commitment and the existing transmission commitments (502). In some implementations, for the purposes of the simulation, the time periods for completing each of the existing transmission commitments are considered to be identical to the time period for completing the proposed transmission commitment. In some implementations, the joint simulation is performed only for transmission commitments where the distribution criteria of the transmission commitment overlaps with the distribution criteria of at least one other transmission commitment, which can increase the efficiency of the joint simulation.

The system determines a risk factor for the proposed transmission commitment (504). In some implementations, the system determines the risk factor for a transmission commitment based at least in part on the variance of the transmission scores of prior transmissions in the logged data where the distribution criteria of the prior transmissions match the distribution criteria of the transmission commitment and the delivery time of the prior transmissions matches the time period for completing the transmission commitment. For example, the risk factor may be determined based at least in part on a function (e.g., a constant multiple) of the standard deviation of the transmission scores of prior transmissions in the logged data where the distribution criteria of the prior transmissions match the distribution criteria of the transmission commitment and the delivery time of the prior transmissions matches the time period for completing the transmission commitment. In some other implementations, the system determines the risk factor for a transmission commitment based at least in part on the variance of the transmission scores of prior transmissions assigned to the transmission commitment by the joint simulation process (described with reference to FIG. 3). For example, the risk factor may be determined based at least in part on a function (e.g., a constant multiple) of the standard deviation of the transmission scores of prior transmissions assigned to the transmission commitment by the joint simulation process.

The system may determine the risk factor for a transmission commitment based at least in part on the time period for completing the transmission commitment. In some implementations, the time period for completing the transmission commitment being further into the future causes a higher risk factor to be determined for the transmission commitment. For example, the risk factor may be determined based at least in part on a function (e.g. a constant multiple) of the duration of time between when the risk factor of the transmission is determined and the endpoint of the time period for completing the transmission commitment.

The system determines a transfer cost for each existing transmission commitment (506). The transfer cost of an existing transmission commitment reflects an expected change in the cost to complete the existing transmission commitment due to jointly completing the proposed transmission commitment along with the other existing transmission commitments. The transfer cost for an existing transmission commitment may be determined based at least in part on the difference between the expected cost of the existing transmission commitment generated by the joint simulation and the expected cost of the existing transmission commitment generated by a previous joint simulation performed when the fixed amount to be charged for the existing transmission commitment was determined. Specifically, the previous joint simulation included the existing transmission commitment and any other transmission commitments that existed when the fixed amount to be charged for the existing transmission commitment was determined. For those transmission commitments that were excluded from the joint simulation because their distribution criteria do not overlap with the distribution criteria of any other transmission commitments, the transfer cost may be determined as zero.

The system determines a fixed amount to be charged for completion of the proposed transmission commitment (508). In general, the system determines the fixed amount to be charged for completion of the proposed transmission commitment based at least in part on the expected cost of the proposed transmission commitment based on the joint simulation, the transfer costs of the existing transmission commitments, and the risk factor of the proposed transmission commitment. For example, in some cases, the system determines the fixed amount to be charged for completion of the proposed transmission commitment as the sum of the expected cost of the proposed transmission commitment, the transfer costs of the existing transmission commitments, and the risk factor of the proposed transmission commitment.

In some cases, the system may determine the proposed transmission commitment to be invalid because, for example, the proposed transmission commitment is not achievable. For example, if the proposed transmission commitment requires assignment of too many of the prior transmissions of the logged data that match the proposed transmission in distribution criteria and delivery time, then the system may determine the proposed transmission commitment to be invalid. The proposed transmission commitment may be determined to require assignment of too many of the prior transmissions of the logged data if the minimum number of transmissions specified in the terms of the proposed transmission commitment are greater than a threshold based on the total number of prior transmissions that match the proposed transmission commitment in distribution criteria and delivery time. For example, the threshold may be determined as a fixed fraction (e.g., 80% or some other portion) of the total number of prior transmissions that match the proposed transmission commitment.

The system determines a gain (e.g., a revenue or profit) of the proposed transmission commitment after completing the proposed transmission commitment by performing a normalization routine to ensure that the proposed transmission commitment receives an appropriate amount of credit for its contribution to the gain made by the system (510). In some cases, the system determines the gain of the proposed transmission commitment based on the expected cost of the proposed transmission commitment determined by the joint simulation, the risk factor of the proposed transmission commitment, and the actual cost of the proposed transmission commitment (i.e., the actual compensation provided by the system for completion of the proposed transmission commitment). For example, the system may determine the gain by summing the expected cost and the risk factor and subtracting the actual cost. In these cases, although the transfer costs of the existing transmission commitments were used to determine the fixed amount to be charged for completing the proposed transmission commitment, they do not necessarily factor into the gain calculation, since they reflect expected increases in the costs of completing other transmission commitments.

The values determined by the system for the expected cost and risk factor of a transmission commitment may be dependent on when the system computes them. For example, the prior transmissions included in the logged data may be updated over time to include more recent prior transmissions and/or to exclude less recent prior transmissions, thereby potentially altering the expected costs and risk factors determined by the system based on the logged data. Drift errors measuring changes in the values determined by the system at different times for the expected costs and risk factors of a transmission commitment may be computed. For example, drift errors may be computed by determining the absolute values of differences between values determined by the system for the expected costs and risk factors for transmission commitments between when the fixed amount to be charged for completion of the transmission commitment is determined and a later time. In some cases, the drift error in the expected cost of a transmission commitment is determined with reference to simulations to determine the expected cost of the transmission commitment that do not include any other transmission commitments.

The actual cost to complete the proposed transmission commitment may be different from an expected cost to complete the proposed transmission commitment (e.g., determined prior to completing the proposed transmission commitment using the simulation apparatus discussed with reference to FIG. 2). A realization error measuring a difference in the actual cost and the expected cost to complete the proposed transmission commitment may be determined by the system, for example by computing the absolute value of the difference between the actual cost and the expected cost to complete the proposed transmission commitment. In response to determining a consistent bias in realization errors, the fixed cost to be charged for completion of future proposed transmission commitments (i.e., proposed transmission commitments that are received in the future) may be adjusted accordingly. For example, in response to determining that the expected cost to complete transmission commitments is consistently lower than actual costs to complete transmission commitments, the fixed costs to be charged for completion of future proposed transmission commitments may be increased. Conversely, in response to determining that the expected cost to complete transmission commitments is consistently higher than actual costs to complete transmission commitments, the fixed costs to be charged for completion of future proposed transmission commitments may be decreased.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System ((IPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for performing a joint simulation for satisfying multiple different coexisting digital component transmission commitments, comprising:
   accessing logged data for prior transmissions of digital components, wherein the logged data includes transmission scores for the transmissions of digital components, distribution criteria that triggered the transmissions of the digital components, and delivery times of the transmissions of the digital components;
   assigning different digital component transmissions included in the logged data to different ones of the multiple different transmission commitments, including:
      for a particular digital component transmission in the logged data, assigning the particular digital component transmission to a given transmission commitment where distribution criteria of the given transmission commitment match distribution criteria that triggered the particular digital component transmission and a time period for completing the given transmission commitment matches the delivery time of the particular digital component transmission, comprising:
         identifying multiple transmission commitments where (i) the distribution criteria of the transmission commitment matches the distribution criteria that triggered the particular digital component transmission, and (ii) a time period for completing the transmission commitment matches the delivery time of the particular digital component transmission; and
         selecting the given transmission commitment from the identified transmission commitments in accordance with a probability distribution over the identified transmission commitments, wherein:
            each of the multiple different transmission commitments specifies a corresponding minimum number of digital component transmissions over a time period for completing the transmission commitment and
            the probability distribution is parametrized by, for each of the identified transmission commitments, the corresponding minimum number of digital component transmissions over the time period for completing the identified transmission commitment; and
   for each transmission commitment of the multiple different transmission commitments, determining an expected cost that results in the transmission commitment being allocated at least the corresponding minimum number of digital component transmissions over the time period for completing the transmission commitment based on the digital component transmissions of the logged data that were assigned to the multiple different transmission commitments.

2. The method of claim 1, wherein assigning the particular digital component transmission to the given transmission commitment further comprises:
   determining that the distribution criteria that triggered the transmission of the particular digital component include a particular distribution criterion;
   determining a first number of digital component transmissions that were previously assigned to the given transmission commitment;
   determining a second number of digital component transmissions that were previously assigned to the given transmission commitment because the distribution criteria that triggered the transmissions of the digital components include the particular distribution criterion;
   determining that the second number does not exceed a threshold based on the first number.

3. The method of claim 1, wherein the distribution criteria that triggered the transmissions of the digital components include one or both of:
   characteristics of electronic documents where the digital components were presented after transmission of the digital components; and
   characteristics of devices where the electronic documents were displayed.

4. The method of claim 1, further comprising:
   determining, for each transmission commitment, that transmission criteria of the transmission commitment overlap with a set of transmission criteria of at least one different transmission commitment.

5. The method of claim 1, further comprising:
   determining a transfer cost for each transmission commitment of a first subset of the multiple different transmission commitments, including computing a difference between the determined expected cost of the transmission commitment and an initial expected cost of the transmission commitment;
   for a different transmission commitment not included in the first subset of the multiple different transmission commitments:
      determining a risk factor for the different transmission commitment;
      determining a fixed amount to be charged for the different transmission commitment based on: (i) the risk factor for the different transmission commitment, (ii) the expected cost of the different transmission commitment, and (iii) the determined transfer costs for the digital component of the first subset of the multiple different transmission commitments.

6. The method of claim 5, further comprising:
   after completion of the different transmission commitment, determining a gain of the different transmission commitment based on: (i) the risk factor for the different transmission commitment, (ii) the expected cost of the different transmission commitment, and (iii) the actual cost of the different transmission commitment.

7. The method of claim 6, further comprising:
   adjusting the time period for completing each transmission commitment of the first subset of the multiple different transmission commitments to be the same as the time period for completing the different transmission commitment.

8. The method of claim 7, wherein the risk factor for the different transmission commitment is based at least in part on a measure of variance of the transmission scores for the transmissions of digital components of the logged data that were assigned to the different transmission commitment.

9. The method of claim 8, wherein the risk factor for the different transmission commitment is based at least in part on the time period for completing the different transmission commitment.

10. The method of claim 9, further comprising:
determining a total number of digital component transmissions included in the logged data where the distribution criteria that triggered the transmission of the digital component matches transmission criteria of the different transmission commitment and the delivery time of the digital component transmission matches the time period for completing the different transmission commitment;
determining that the specified minimum number of digital component transmissions over the time period for completing the different transmission commitment exceeds a threshold based on the total number; and
determining the fixed amount to be charged for the different transmission commitment to be invalid.

11. A non-transitory computer storage medium encoded with a computer program, the program comprising instructions that when executed by data processing apparatus cause the data processing apparatus to perform operations for performing a joint simulation for satisfying multiple different coexisting digital component transmission commitments, the operations comprising:
accessing logged data for prior transmissions of digital components, wherein the logged data includes transmission scores for the transmissions of digital components, distribution criteria that triggered the transmissions of the digital components, and delivery times of the transmissions of the digital components;
assigning different digital component transmissions included in the logged data to different ones of the multiple different transmission commitments, including:
for a particular digital component transmission in the logged data, assigning the particular digital component transmission to a given transmission commitment where distribution criteria of the given transmission commitment match distribution criteria that triggered the particular digital component transmission and a time period for completing the given transmission commitment matches the delivery time of the particular digital component transmission, comprising:
identifying multiple transmission commitments where (i) the distribution criteria of the transmission commitment matches the distribution criteria that triggered the particular digital component transmission, and (ii) a time period for completing the transmission commitment matches the delivery time of the particular digital component transmission; and
selecting the given transmission commitment from the identified transmission commitments in accordance with a probability distribution over the identified transmission commitments, wherein:
each of the multiple different transmission commitments specifies a corresponding minimum number of digital component transmissions over a time period for completing the transmission commitment and
the probability distribution is parametrized by, for each of the identified transmission commitments, the corresponding minimum number of digital component transmissions over the time period for completing the identified transmission commitment and for each transmission commitment of the multiple different transmission commitments, determining an expected cost that results in the transmission commitment being allocated at least the corresponding minimum number of digital component transmissions over the time period for completing the transmission commitment based on the digital component transmissions of the logged data that were assigned to the multiple different transmission commitments.

12. The non-transitory computer storage medium of claim 11 wherein assigning the particular digital component transmission to the given transmission commitment further comprises:
determining that the distribution criteria that triggered the transmission of the particular digital component include a particular distribution criterion;
determining a first number of digital component transmissions that were previously assigned to the given transmission commitment;
determining a second number of digital component transmissions that were previously assigned to the given transmission commitment because the distribution criteria that triggered the transmissions of the digital components include the particular distribution criterion;
determining that the second number does not exceed a threshold based on the first number.

13. The non-transitory computer storage medium of claim 11 further comprising:
determining a transfer cost for each transmission commitment of a first subset of the multiple different transmission commitments, including computing a difference between the determined expected cost of the transmission commitment and an initial expected cost of the transmission commitment;
for a different transmission commitment not included in the first subset of the multiple different transmission commitments:
determining a risk factor for the different transmission commitment;
determining a fixed amount to be charged for the different transmission commitment based on: (i) the risk factor for the different transmission commitment, (ii) the expected cost of the different transmission commitment, and (iii) the determined transfer costs for the digital component of the first subset of the multiple different transmission commitments.

14. A system for performing a joint simulation for satisfying multiple different coexisting digital component transmission commitments, the system comprising:
a memory storing logged data for prior transmissions of digital components, wherein the logged data includes transmission scores for the transmissions of digital components, distribution criteria that triggered the transmissions of the digital components, and delivery times of the transmissions of the digital components;
a simulation apparatus, including one or more processors, that executes instructions that cause the simulation apparatus to perform operations comprising:
accessing the logged data that is stored in the memory;

assigning different digital component transmissions included in the logged data to different ones of the multiple different transmission commitments, including:
   for a particular digital component transmission in the logged data, assigning the particular digital component transmission to a given transmission commitment where distribution criteria of the given transmission commitment match distribution criteria that triggered the particular digital component transmission and a time period for completing the given transmission commitment matches the delivery time of the particular digital component transmission, comprising:
     identifying multiple transmission commitments where (i) the distribution criteria of the transmission commitment matches the distribution criteria that triggered the particular digital component transmission, and (ii) a time period for completing the transmission commitment matches the delivery time of the particular digital component transmission; and
     selecting the given transmission commitment from the identified transmission commitments in accordance with a probability distribution over the identified transmission commitments, wherein:
       each of the multiple different transmission commitments specifies a corresponding minimum number of digital component transmissions over a time period for completing the transmission commitment and
       the probability distribution is parametrized by, for each of the identified transmission commitments, the corresponding minimum number of digital component transmissions over the time period for completing the identified transmission commitment and
   for each transmission commitment of the multiple different transmission commitments, determining an expected cost that results in the transmission commitment being allocated at least the corresponding minimum number of digital component transmissions over the time period for completing the transmission commitment based on the digital component transmissions of the logged data that were assigned to the multiple different transmission commitments.

15. The system of claim 14, wherein assigning the particular digital component transmission to the given transmission commitment further comprises:
   determining that the distribution criteria that triggered the transmission of the particular digital component include a particular distribution criterion;
   determining a first number of digital component transmissions that were previously assigned to the given transmission commitment;
   determining a second number of digital component transmissions that were previously assigned to the given transmission commitment because the distribution criteria that triggered the transmissions of the digital components include the particular distribution criterion;
   determining that the second number does not exceed a threshold based on the first number.

16. The system of claim 14 wherein the simulation apparatus performs further operations comprising:
   determining a transfer cost for each transmission commitment of a first subset of the multiple different transmission commitments, including computing a difference between the determined expected cost of the transmission commitment and an initial expected cost of the transmission commitment;
   for a different transmission commitment not included in the first subset of the multiple different transmission commitments:
     determining a risk factor for the different transmission commitment;
     determining a fixed amount to be charged for the different transmission commitment based on: (i) the risk factor for the different transmission commitment, (ii) the expected cost of the different transmission commitment, and (iii) the determined transfer costs for the digital component of the first subset of the multiple different transmission commitments.

17. The system of claim 16, wherein the simulation apparatus performs further operations comprising:
   after completion of the different transmission commitment, determining a gain of the different transmission commitment based on: (i) the risk factor for the different transmission commitment, (ii) the expected cost of the different transmission commitment, and (iii) the actual cost of the different transmission commitment.

18. A method for performing a joint simulation for satisfying multiple different coexisting digital component transmission commitments, comprising:
   accessing logged data for prior transmissions of digital components, wherein the logged data includes transmission scores for the transmissions of digital components, distribution criteria that triggered the transmissions of the digital components, and delivery times of the transmissions of the digital components;
   assigning different digital component transmissions included in the logged data to different ones of the multiple different transmission commitments, including:
     for a particular digital component transmission in the logged data, assigning the particular digital component transmission to a given transmission commitment where distribution criteria of the given transmission commitment match distribution criteria that triggered the particular digital component transmission and a time period for completing the given transmission commitment matches the delivery time of the particular digital component transmission, comprising:
       determining that the distribution criteria that triggered the transmission of the particular digital component include a particular distribution criterion;
       determining that a first number of digital component transmissions were previously assigned to the given transmission commitment;
       determining that a second number of digital component transmissions were previously assigned to the given transmission commitment because the distribution criteria that triggered the transmissions of the digital components include the particular distribution criterion; and
       determining that the second number does not exceed a threshold based on the first number; and
   for each transmission commitment of the multiple different transmission commitments, determining an expected cost that results in the transmission commitment being allocated at least a specified minimum number of digital component transmissions over the time period for completing the transmission commitment based on the digital component transmissions of the logged data that were assigned to the multiple different transmission commitments.

19. A method for performing a joint simulation for satisfying multiple different coexisting digital component transmission commitments, comprising:

accessing logged data for prior transmissions of digital components, wherein the logged data includes transmission scores for the transmissions of digital components, distribution criteria that triggered the transmissions of the digital components, and delivery times of the transmissions of the digital components;

assigning different digital component transmissions included in the logged data to different ones of the multiple different transmission commitments, including:

for a particular digital component transmission in the logged data, assigning the particular digital component transmission to a given transmission commitment where distribution criteria of the given transmission commitment match distribution criteria that triggered the particular digital component transmission and a time period for completing the given transmission commitment matches the delivery time of the particular digital component transmission;

for each transmission commitment of the multiple different transmission commitments, determining an expected cost that results in the transmission commitment being allocated at least a specified minimum number of digital component transmissions over the time period for completing the transmission commitment based on the digital component transmissions of the logged data that were assigned to the multiple different transmission commitments;

determining a transfer cost for each transmission commitment in a first subset of the multiple different transmission commitments, including computing a difference between the determined expected cost of the transmission commitment and an initial expected cost of the transmission commitment; and for a different transmission commitment not included in the first subset of the multiple different transmission commitments:

determining a risk factor for the different transmission commitment; and determining a fixed amount to be charged for the different transmission commitment based on: (i) the risk factor for the different transmission commitment, (ii) the expected cost of the different transmission commitment, and (iii) the determined transfer costs for the transmission commitments of the first subset of the multiple different transmission commitments.

* * * * *